US006524210B1

(12) United States Patent
Vorndran

(10) Patent No.: US 6,524,210 B1
(45) Date of Patent: Feb. 25, 2003

(54) AUTOMATIC TRANSMISSION

(75) Inventor: Ralf Vorndran, Eriskirch (DE)

(73) Assignee: ZF Batavia, L.L.C., Batavia, OH (US)

( * ) Notice: Subject to any disclaimer, the term of this patent is extended or adjusted under 35 U.S.C. 154(b) by 0 days.

(21) Appl. No.: 09/553,670

(22) Filed: Apr. 20, 2000

(30) Foreign Application Priority Data

May 4, 1999 (DE) ........................................ 199 20 378

(51) Int. Cl.[7] .......................... F16H 9/18; F16H 37/02; F16D 25/062; B60K 41/28
(52) U.S. Cl. ............................ 475/210; 474/28; 477/33
(58) Field of Search ................................ 475/208, 209, 475/210; 474/28; 477/44, 45, 39

(56) References Cited

U.S. PATENT DOCUMENTS

| 3,847,258 A | * | 11/1974 | Matyschik ............... 192/110 B |
| 3,901,362 A | * | 8/1975 | Selzer .......................... 192/98 |
| 4,313,644 A | * | 2/1982 | Dagiel ................... 192/110 B |
| 4,502,352 A | * | 3/1985 | Svab .......................... 475/210 |
| 4,653,621 A |   | 3/1987 | Oshiage ...................... 477/175 |
| 5,024,310 A |   | 6/1991 | Murano et al. ................ 477/39 |
| 5,170,868 A |   | 12/1992 | Yamashita et al. ............ 477/39 |
| 5,188,007 A | * | 2/1993 | Hattori et al. .......... 475/210 X |
| 5,431,602 A | * | 7/1995 | Hendriks et al. ............. 474/28 |
| 5,871,411 A | * | 2/1999 | Senger et al. ................. 474/28 |
| 5,885,186 A | * | 3/1999 | Van Wijk et al. ......... 475/45 X |

FOREIGN PATENT DOCUMENTS

| DE | 37 03 245 A1 | 8/1987 |
| EP | 0 107 193 A2 | 5/1984 |
| EP | 0 200 829 A1 | 11/1986 |
| EP | 0 306 351 A1 | 3/1989 |
| EP | 0 324 928 A2 | 7/1989 |
| EP | 0 412 758 A2 | 2/1991 |
| EP | 0 498 210 A1 | 8/1992 |
| JP | 59-121250 A | * | 7/1984 |
| JP | 59-175666 A | * | 10/1984 |
| JP | 60-98261 A | * | 6/1985 |

OTHER PUBLICATIONS

Daieff, Bertrand, Josef Kern, Helmut Krenn & Heinrich Petra, "CVT für Heckantrieb", *ATZ Automobiltechnische Zeitschrift* 96 (1994) 10, pp. 578–587.

* cited by examiner

Primary Examiner—Ankur Parekh
(74) Attorney, Agent, or Firm—Davis & Bujold, P.L.L.C.

(57) ABSTRACT

An automatic transmission having at the input a starting element (4), a reversing set (46), a first electronic control unit (65) and a cone pulley (29) fixedly supported on one primary shaft (18) and axially thereto a hydraulically adjustable cone pulley (30), both pulleys forming a primary variator part (19). In addition there is a cone pulley (31) fixedly supported on a secondary shaft (21) and axially thereto a hydraulically adjustable cone pulley (32) together forming a secondary variator part (20) wherein a belt-type organ (37) between the cone pulleys (29, 30, 31,32) drivingly connects the primary variator part (19) with the secondary variator part (20). The starting element (4) is a dry running disc clutch whose disc is non-rotatably connected with the primary shaft (18) and interacts in a clutch housing (14) with a non-rotatably but axially movably disposed pressure plate (7) actuated via axial bearings (9) by a non-rotating actuator (10, 11), the clutch housing (14) being non-rotatably connected with an input shaft (2) of a prime mover (1). The purpose is to reduce the rotating masses and to improve the adjustment of the variator (19, 20).

20 Claims, 4 Drawing Sheets

AUTOMATIC TRANSMISSION

BACKGROUND OF THE INVENTION

The invention concerns an automatic transmission.

The automatically controlled transmission has a continuously variable ratio step with a primary variator pulley and a secondary variator pulley, which are drivingly interconnected by a belt-type organ in the form of a chain or belt. Such so-called CVT transmissions, continuously variable transmissions, are known already, e.g. from *ATZ Automobiltechnische Zeitschrift* 96 (1994), pp. 578 to 587. Aside from the variator, a disc clutch in the form of a hydrodynamic torque converter with lock-up clutch is provided on the input side of the transmission. A pump wheel of the hydrodynamic torque converter is driven by an internal combustion piston engine as the prime mover and is non-rotatably connected with a power part of a hydraulic pump, such as a radial piston pump.

Situated between the variator and the hydrodynamic torque converter is a reversing set in planetary design which has one clutch for the forward drive and one brake for the reverse drive. For adapting the variator thrust to a convenient total ratio of the transmission, an intermediate step is rear-mounted on the variator. The intermediate step can also serve as adaptation of direction of rotation and also takes care of an output coaxial with the input shaft.

Each one of the primary and secondary variator pulleys has a cone pulley fixedly connected, respectively, with the primary shaft and secondary shaft and an axially displaceable cone rotatable therewith. The displaceable cones have a piston chamber for the hydraulic axial adjustment. To change the reduction ratio, an electronic regulating device, of the transmission, controls the piston chambers of the movable cones, the pressure medium reaching the rotating piston chambers via ducts in the shafts.

Depending on the rotational speed, the pressure medium is subject to different centrifugal forces which override the control and must be accordingly taken into account. In addition, the pressure medium in the rotating piston chambers increases the masses of the rotating parts and therewith the drag torque which acts negatively, the required contact pressures and thus upon the efficiency of the transmission when adjusting speed. The torque converter exerts a similarly negative influence in relation to the drag torque of the transmission even when the lock-up clutch is closed in order to keep the hydrodynamic losses in the converter low in some operating ranges. CVT transmissions are basically known for small cars, which have a simple starting element in the form of a magnetic powder or multi-disc wet clutch, instead of the hydrodynamic torque converter.

The problem, on which the invention is based, is to reduce the drag torque of the rotating parts and the flow rate need of the hydraulic actuators, the same as to improve the operating behavior.

SUMMARY OF THE INVENTION

According to the invention, the starting element is a dry-disc clutch whose disc is non-rotatably connected with the primary shaft and interacts in a clutch housing with a non-rotatably, but axially movably disposed pressure plate. A non-rotating actuator conveniently situated on a clutch bell housing actuates via an axial bearing the pressure plate, which presses the disc against a friction surface in the clutch housing. The clutch housing itself, which can form part of an inertia mass of a prime mover, is non-rotatably connected with the input shaft of the prime mover, such as a crankshaft or a flywheel connected therewith.

In open state, the dry disc clutch clearly separates the prime mover from the transmission without the tow torques being transmitted to the primary shaft by the fluid friction. Further creep of the vehicle is prevented when parked. The rotating masses of the disc clutch, connected with the transmission, are very small. They consist only of the disc connected with the primary shaft while the actuator is situated in the clutch bell housing and does not rotate.

The actuator conveniently consists of a hydraulic piston which, designed as an annular piston, in an annular cylinder of the clutch bell housing and is loaded with hydraulic oil by a transmission oil pump, the control being effected via an electronic pressure-control unit of a control unit of the transmission. The hydraulic piston closes the clutch while a recoil spring opens the disc clutch. It is thus ensured that, in case of failure of the hydraulic system, the clutch is brought to the safe open state. The power part of the transmission oil pump is non-rotatably connected with the pressure plate. Thus, it is driven at the rotational speed of the prime mover and thereby consumes only a small amount of power at idling speed and in a low rotational speed range, whereby the efficiency of the transmission is improved.

According to a development of the invention, two redundant annular pistons act upon the pressure plate, via the axial bearing, so as to ensure the driveability as long as possible. In normal operation, a first annular piston is controlled by means of the transmission oil pump, while a second control unit controls the second annular piston by means of a pressure supply pump, independent of the transmission oil pump, when a first electronic control unit and/or the hydraulic system of the transmission fails and/or a electronic control unit detects an ABS operation. By ABS operation is understood an operation state in which an anti-lock system reacts.

An independent pressure supply can serve the ABS hydraulic system and the oil supply of an auxiliary steering pump, the second electronic control unit can be integrated in an engine control unit or in an ABS control unit. If one of the electronic control units detects an ABS operation, drive line slip losses are reduced when the anti-lock system is active.

The hydraulic pistons are conveniently designed as annular pistons and consecutively shifted in series. They can be shifted into each other so that one piston serves wholly or partly as a cylinder for the other hydraulic piston. The annular pistons surround the extension of the primary shaft and the drag between the pressure plate and the transmission oil pump. The drag is designed as a hollow shaft and supported on the extension of the primary shaft. Thereby a small construction volume results and, in addition, a good reaction behavior of the clutch is obtained by the short hydraulic connections.

According to a development of the invention, in order further to reduce the rotating masses, cylinder-piston units, which adjust the movable cones of the variator, are situated fixed to the housing. Thereby is obtained that the hydraulic medium is not exposed to any centrifugal forces which must be taken into account in the control. The forces, which are exerted upon the variator pulleys by the cylinder-piston units, support themselves in the transmission housing via the primary shaft or the secondary shaft and the appertaining fixed bearing. Between the cylinder-piston units and the adjustable cones, axial bearings are provided which reduce the friction. In this case, relatively short hydraulic ducts fixed to the housing can also be designed with a large cross-section whereby the response behavior of the variator is improved. Finally, it is possible to omit the otherwise usual dynamic pressure-compensating chamber and expensive seals between parts having different rotational speeds.

According to one other development of the invention, a reversing set in planetary design is situated on the secondary shaft. In addition to a sun gear and an internal geared wheel, it has a double planet so that the reduction ratio of the reversing set can be equally designed in both directions. The total ratio of the transmission and the adaptation, specific to the vehicle of the direction of rotation during forward drive, can be determined by a rear-mounted intermediate step. The sun gear of the reversing set is non-rotatably connected with the secondary shaft and in forward drive range can be coupled via a clutch with a planet carrier. For reverse drive, the clutch is opened and the internal geared wheel slowed down by a brake. For the output, an output gear wheel is non-rotatably connected with the planet carrier.

To be able to transmit sufficient torque in the forward drive, it is convenient that the internal disc carrier of the clutch designed as disc clutch be connected with the planet carrier and the external disc carrier with the secondary shaft and the sun gear. For the friction surfaces thus results a larger, more effective diameter based on the secondary shaft.

The brake is conveniently designed centered in position as one-disc brake, wherein the brake disc fastened to the internal geared wheel is situated in a brake caliper between two pistons which are controlled via a brake valve. Together with the small rotating mass of the brake disc, the advantage results that the two brake pistons in the double-piston arrangement, such as has proved satisfactory for vehicle service brakes, quickly release the brake disc during pressure break down by slightly recoiling. Thereby are clearly reduced drag losses in the forward drive operation in which the reversing gear set rotates as block.

The annular piston for actuating the starting clutch of the transmission hydraulic system is conveniently controlled by an electronic pressure-control unit via a pressure-control valve. The characteristic of the pressure-control unit is laid out so that the appertaining cylinder of the first annular piston is ventilated when the first electronic control unit of the transmission passes to emergency operation. The disc clutch opens and thus changes to the safety state.

When the first electronic control unit, which is capable of regulating the transmission, passes to the interference mode bit, the second annular piston is conveniently controlled directly by an electronic pressure-control unit placed in the transmission. At the same time, the second piston is supplied with energy by an independent pressure supply, such as an auxiliary steering pump or an anti-lock system. The control of the second annular piston can be integrated in an electronic engine control or can be effected by a pressure-control valve integrated in an ABS block.

The first electronic control unit of the transmission, the electronic control unit of the anti-lock system and the electronic control unit of the prime mover conveniently communicate, via a CAN bus (controller area network), and thus exchange data relevant to the control. The characteristic of the control of the second annular piston is designed so that, in case of power failure, it ventilates the appertaining cylinder and thus the disc clutch is opened. Thus, in case of failure of the transmission control, the engine control takes over the control logic for the disc clutch. Besides, the ABS control unit can for its part improve during ABS operation, the regulation excellence and the driving stability by its opening during ABS operation, via the second annular piston, the disc clutch and thus clearly reducing the drive line drag torque by uncoupling the prime mover.

The movable cones of the variator can be conveniently controlled, according to the "master-slave principle", i.e. the pressure in the cylinder-piston unit for the secondary variator pulley corresponds to the secondary torque to be transmitted, and the pressure of the cylinder-piston unit for the primary variator pulley is determined by a ratio regulator according to the selected cylinder surface ratio. The surfaces of the cylinder are ideally selected so as not to fall below the contact pressure need of the secondary variator pulley, taking into account the smallest possible system pressure for maintaining the pre-control pressure supply of about 6 bar. The theoretical minimum pressure for constant drive in the total load and rotational speed range must likewise be laid out on the value.

The movable cones of the variator can also be controlled according to the "partner principle", i.e. equal surfaces are used for the cylinder-piston units of the primary side and secondary side of the variator and the ratio is controlled via a square slide.

In both cases, since the cylinder-piston units are stationary in the housing and not exposed to any centrifugal forces, an oil supply for a dynamic pressure-compensation chamber and the latter, itself, can be omitted.

In one other development of the invention, it is proposed that the transmitting capacity of the clutch and brake of the reversing gear set be selected so that the pressure on the secondary variator pulley, including the required safety factor, is directly used as operation pressure for the clutch and brake. Thereby it is possible with an electronic pressure-control unit to make the contact pressure for the cones, the clutch pressure and the brake pressure available.

It is also advantageous that the reversing gear set be shifted only when the disc clutch is open and the shifting process be controlled by pressure ramps on the pressure on the secondary variator pulley. It is possible to implement the shifting process with a good shifting comfort without volume damper for the clutch and/or the brake.

The brake of the reversing gear set is actuated by a precontrolled brake valve via a closed system. In reverse drive, the working piston of the brake valve is connected directly, via a shift valve, with the pressure of the secondary variator pulley by the position of the shift valve and the working volume of the working piston joins the pistons to the brake disc against the force of a spring. In the neutral position of the selector lever, the spring moves the brake piston and the working piston back to the initial position. Thereby the brake disc can freely move causing no drag losses either in the forward drive or in the neutral position.

In this system, since the variator cannot be uncoupled in the sense of a parking adjustment, in order to assist a return to "low", it is further proposed that for pressure control in the clutch or in the brake, a pressure-regulating valve be front-amounted on the shift valve.

Finally, it is advantageous for control of the operation cycle, for regulation of the variator ratio and regulation of the disc clutch to measure by Hall sensors the rotational speed of the prime mover on the clutch housing, the rotational speed of the primary variator pulley on the primary shaft, the rotational speed of the secondary variator pulley on the secondary shaft and the initial rotational speed of the output shaft on a differential.

BRIEF DESCRIPTION OF THE DRAWINGS

Other advantages result from the description he drawing that follows. In the drawing is shown an embodiment of the invention. The description and the claims contain numerous features in combination. The expert will conveniently regard the features separately and make with them logical added combinations. In the drawing:

DESCRIPTION OF THE PREFERRED EMBODIMENTS

Figure 1:
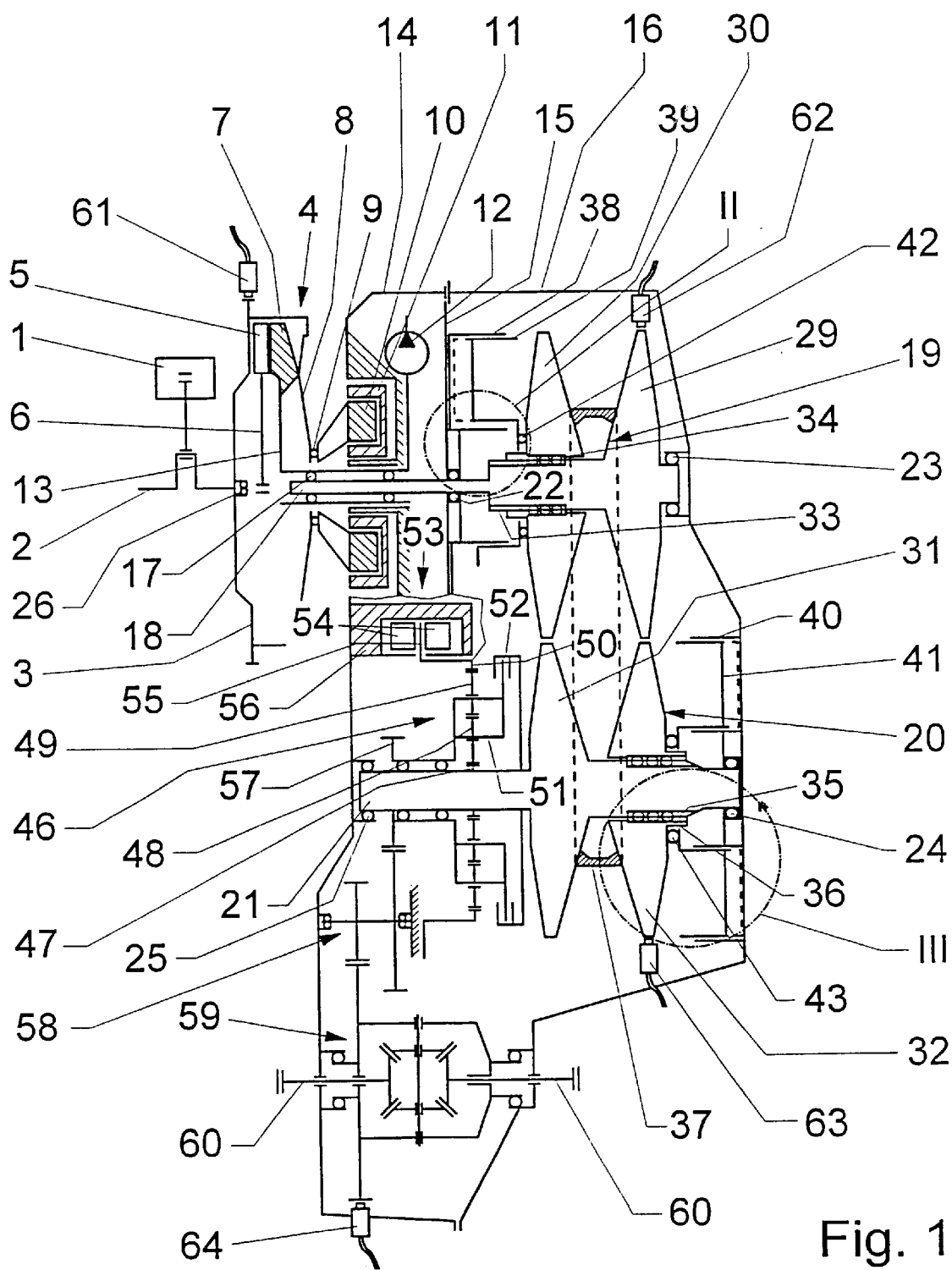
FIG. 1 is a diagrammatic representation of an inventive transmission in longitudinal section.

A prime mover 1, as a rule an internal combustion piston engine, drives via an input shaft 2, its crankshaft, a flywheel designed clutch housing 3 of a disc clutch 4, in the instant case a dry starting clutch. The latter has one disc 5 pressed by a pressure plate 7 on to a friction surface of the clutch housing 3. The input shaft 2 and the housing 3 firmly connected therewith are rotatably supported by a bearing 26 in a housing (not shown in detail) of the prime mover 1.

A disc carrier 6 of the disc 5 is non-rotatably connected with a primary shaft 18 of a primary variator pulley 19 so that when the disc clutch 4 is engaged, a torque is transmitted from the prime mover 1 to the primary shaft 18 which is the input shaft of the transmission. The pressure plate 7, which rotates with the clutch housing 3, is actuated, via an axial bearing 9, by a first annular piston 10 which is an annular piston guided in an annular cylinder formed by a second hydraulic piston 11 which is axially displaceably in a clutch bell housing 14 firmly connected with a transmission housing 16. The annular pistons 10 and 11 are shifted in parallel and act redundantly upon the disc clutch 4.

The pressure disc 7 has radially inwardly oriented arms 8 to which attaches a hollow-shaft designed drag 13 for a transmission oil pump 12. The drag 13 extends radially within the annular pistons 10, 11 and is supported by bearings 17 upon the primary shaft 18. The power part of the transmission oil pump 12 is thus driven by the prime mover 1 at the speed thereof so that at low rotational speeds of the prime mover 1 the transmission oil pump 12 consumes only a small amount of power. Thereby is improved the total efficiency of the transmission.

The primary variator pulley 19 and secondary variator pulley 20 are drivingly interconnected via a belt-type organ 37 in the form of a thrust articulated belt and provide a continuously variable ratio step. The primary variator pulley 19 has one cone 29 firmly connected with the primary shaft 18 and one cone 30 axially displaceable upon balls 34 in a longitudinal guide 33. The secondary variator pulley 20 has one cone 31 firmly connected with a secondary shaft 21 and one cone 32 non-rotatably connected with the secondary shaft 21 but axially movable on balls 36 in a longitudinal guide 35. The belt-type organ 37 runs respectively between the cones 29, 30 and 31, 32 on an effective contact diameter, the ratio of the contact diameter of the primary variator pulley 19 to the contact diameter of the secondary variator pulley 20 determining the reduction ratio of the continuously variable reduction step.

The reduction ratio can be changed by axial adjustment of the cone 30 and 32. An annular piston 39 upon the primary side and an annular piston 41 on the secondary side serve for this purpose. The pistons 39 and 41 are in corresponding annular cylinders 38 and 40 firmly attached to the housing and can be controlled by the hydraulic system of the transmission via an electronic control unit 65 of the transmission. To reduce friction, the pistons 39 and 41 act via axial bearings 42, 43 upon the cones 30, 32 coordinated with them. Since the cylinders 38 and 40, the same as the pistons 39 and 41, are arranged firmly attached to the housing, their masses do not increase the rotating masses of the transmission. In addition, no centrifugal force acts upon the hydraulic medium in the cylinders 38 and 40 so that no displacement forces subject to centrifugal force have to be taken into account or compensated.

Figure 2:
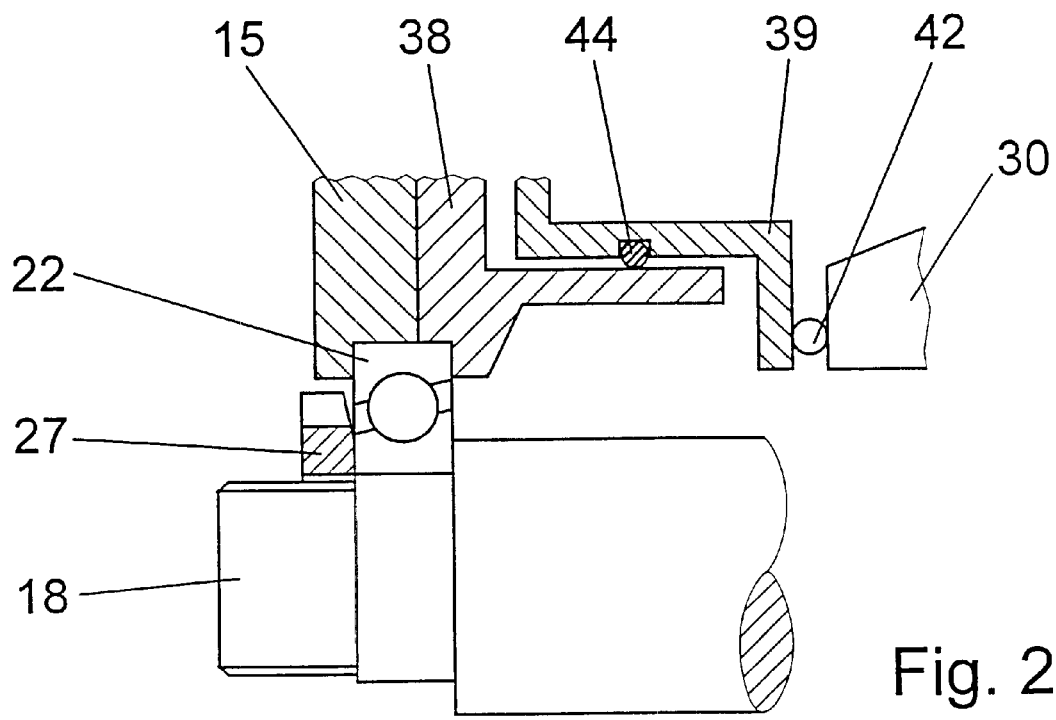
FIG. 2 is a detail according to the line II in FIG. 1.

The primary shaft 18 is supported by a movable bearing 23 in the transmission housing 16, by a fixed bearing 22 in an intermediate plate 15 fastened to the transmission housing 16. The axial displacement forces of the piston 39 are reinforced within the cone 29 via the axial bearing 42, the primary variator pulley 19, the primary shaft 18 and via the fixed bearing 22. FIG. 2 shows an enlarged section corresponding to the line 11 in FIG. 1 from which it results that an inner bearing ring of the fixed bearing 22 is axially fixed between a collar of the primary shaft 18 and a shaft nut 27 while the outer bearing ring of the fixed bearing 22 is axially fixed between the cylinder 38 and the intermediate plate 15. A sealing ring 44 serves to seal the piston 39 in the cylinder 38.

Figure 3:
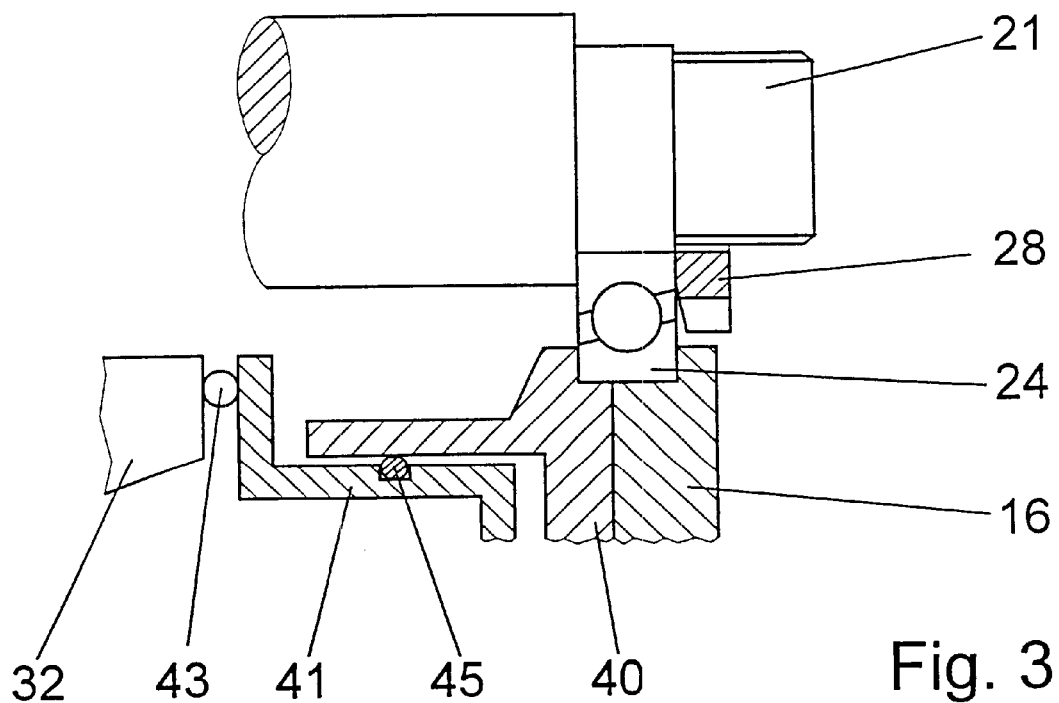
FIG. 3 is a detail according to the line III in FIG. 1.

The secondary shaft 21 is correspondingly supported in the housing 16. On the side of the cone 31 firmly connected with the secondary shaft 21, the secondary shaft 21 is supported in a movable bearing 25 while, on the other end, it is supported in a fixed bearing 24. The inner bearing ring of the fixed bearing 24 is axially fixed between a shaft collar of the secondary shaft 21 and a shaft nut 28. The outer bearing ring of the fixed bearing 24 is axially retained between the cylinder 40 and the housing 16. A sealing ring 45 seals the working space between the piston 41 and the cylinder 40. FIG. 3 shows an enlarged section corresponding to the line III in FIG. 1. The axial displacement forces of the piston 41 are reinforced within the secondary shaft 21 via the axial bearing 43, via the secondary variator pulley 20, via the secondary shaft 21 and the fixed bearing 24.

A reversing gear set 46 in planetary design is situated on the extension of the secondary shaft 21 between the movable bearing 25 and the cone 31 firmly connected with the secondary shaft 21. The reversing gear set 46 has a sun gear 47, a double planet set with two planetary gears 48 and 49 and an internal geared wheel 50. The sun gear 47 is non-rotatably connected with the secondary shaft 21. The planetary gears 48,49 are supported on a planet carrier 51 which, in turn, is supported on the extension of the secondary shaft 21 and non-rotatably connected with an output gear 57.

In order to shift from a neutral position 81 of the reversing gear set 46, where the internal geared wheel 50 and the planet carrier 51 turn freely, to a forward drive position 79, the planet carrier 51 is connected, via a clutch 52, with the secondary shaft 21 or the sun gear 47 so that the output gear 57 is driven at the rotational speed of the secondary shaft 21, the reversing gear set 46 rotating in block. To shift to a reverse drive position 80, the clutch 22 is opened and the internal geared wheel 50 locked in the housing 16 by a brake 53. Thereby the output gear 57 is driven in a reverse direction by the sun gear 47 via the planetary gears 48, 49 and the planet carrier 51. In a reduction ratio one of the reversing gear set 46, the output gear 57 also turns at the rotational speed of the secondary shaft 21, but in a reverse direction of rotation. The reversing gear set 46 is conveniently shifted only when the disc clutch 4 is open.

Figure 4:
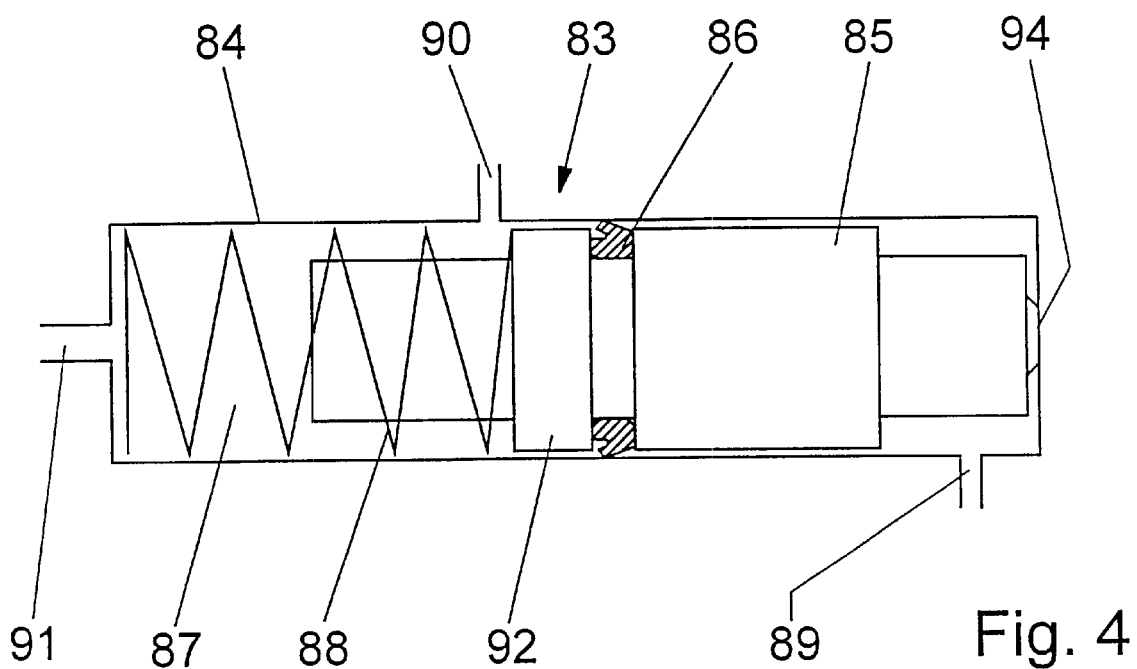
FIG. 4 is a brake valve.

The brake 53 is a fixed caliper brake which moves between two brake pistons 54. The latter are situated in a brake caliper 56 fixed to the housing and are actuated by a precontrolled brake valve 83 (FIG. 4). Such brakes have proved satisfactory as vehicle service brakes and offer the advantage that the pistons 54 slightly recoil during pressure break down and fully release the brake disc 55 so that in forward drive operation the drag losses of the reversing gear set 46 rotating as block are clearly reduced. Besides, the rotating masses are scarcely enlarged by the light brake disc 55.

The clutch 52 is designed as disc clutch, wherein its outer disc carrier is connected with the secondary shaft 21 and its inner disc carrier with the planet carrier 51.

The output gear 57 operates via an intermediate step 58 and a differential 59 upon output shafts 60. By virtue of the intermediate step 58 the general direction of rotation of the transmission and the total ratio can be adapted to the requirements of the vehicle.

To control the operation cycle, to regulate the variator ratio and to regulate the disc clutch 4, rotational speeds on different parts of the transmission are detected by means of rotational speed sensors 61, 62, 63, 64, which are conveniently Hall sensors. The rotational speed sensor 61 is placed on the periphery of the clutch housing 3 or of the flywheel and detects the rotational speed of the prime mover 1. The rotational speed sensor 62 is situated on the periphery of the cone 29 that is firmly connected with the primary shaft 18 and detects the rotational speed of the primary variator pulley 19 while the rotational speed sensor 63 is located on the periphery of the cone 32 of the secondary variator pulley 20 and thus detects the rotational speed of the secondary variator pulley 20. The reduction ratio of the variator pulleys 19, 20 can be calculated from the detected rotational speeds of the rotational speed sensors 62, 63. The output rotational speed of the transmission is detected by the rotational speed sensor 64 which is provided on the periphery of the differential 59. The rotational speed signals with added vehicle parameters, input parameters and drive parameters are processed in the first electronic control unit 65 to adjust signals for the disc clutch 4, for the primary and secondary variator pulleys 19, 20 and for the clutch 52 and the brake 53 of the reversing gear set 46.

Figure 5:
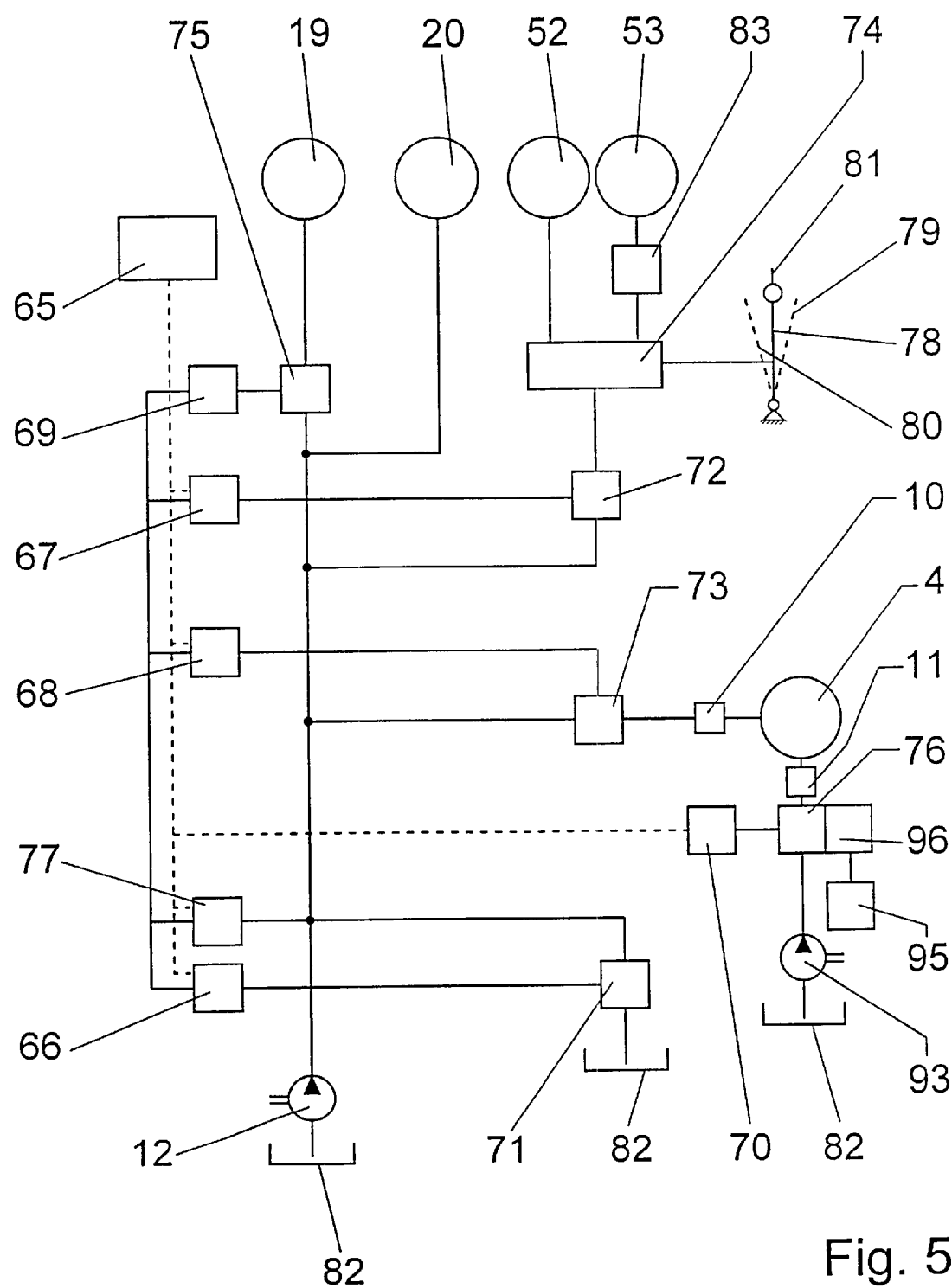
FIG. 5 is a circuit diagram of an electrohydraulic control.

The first electronic control unit 65 comprises electronic pressure-control units 66, 67, 68, 69, 70 which, via pressure-control valves 73, 76, 77 and pressure-regulating valves 72, 75, modify according to the respective use the pressure produced by the transmission oil pump 12 (FIG. 5). The transmission oil pump 12 sucks oil from an oil sump 82 and delivers it into the hydraulic system wherein the pressure level in the secondary side piston chamber 40 is determined via a pressure-limiting valve 71. Thus, the first annular piston 10 is directly controlled via the pressure-control valve 73 by the electronic pressure-control unit 68 of the first electronic control unit 65. The characteristic of the pressure-control unit 68 is laid out so that the first annular piston 10 is ventilated and the disc clutch 4 is opened when the first electronic control unit 65, associated with the transmission, passes to emergency operation. For this case is provided the second hydraulic piston 11 which, via a pressure supply pump 93 on the vehicle side, such as an auxiliary steering pump or an ABS pressurized-oil supply is supplied with energy. The second hydraulic piston 11 is directly controlled by an electronic pressure-control unit 70 supported in the transmission, e.g. for the case that the pressure supply pump 93 takes over the oil supply. But it can also be controlled directly from a pressure-control valve 76 integrated in the ABS block 96. In this case, the characteristic of the pressure-control unit 76 is also laid out so that in case of power failure the second hydraulic piston 11 is ventilated, i.e. the disc clutch 4 is opened.

The operation logic of the control of the second hydraulic piston 11 is integrated in a second electronic control unit 95, e.g. the control unit of the prime mover 1 or of the anti-block system. The second electronic control unit 95 communicates with the first electronic control unit 65 via a CAN bus. In case of failure of the first electronic control unit 65, it takes over the control logic for the disc clutch 4.

The cone 30 on the primary side or the cone 32 on the secondary side can be controlled according to the master-slave principle, i.e. the pressure produced by the transmission oil pump 12 corresponds to the torque to be transmitted to the secondary variator pulley 20 and the pressure drawn therefrom by the pressure-regulating valve 75 for the cone 30 on the primary side corresponding to the selected cylinder surface ratio of the cylinders 38, 40 is determined by the ratio regulator. According to the partner principle, in a control equal surfaces of the cylinders 38, 40 are provided on the primary side and secondary side and the ratio is controlled by using a square slide. Since the cylinders 38 and 40 are disposed firmly attached to the housing, the displacement forces of the pistons 39, 40 are independent of the centrifugal forces.

The surfaces of the cylinders 38, 40 are ideally selected so that the contact force need be ensured on the secondary side without falling below the lowest possible system pressure for maintaining the precontrol pressure supply of about six bar. The theoretical minimum pressure for a constant forward drive in the whole load and rotational speed range must likewise be laid out at the value.

A selector lever 78 serves to introduce the forward drive position 79 or the reverse drive position 80 out of the neutral position 81 and via a shift valve 74 pressurizes in the forward drive position 79 the clutch 52 while in the reverse drive position 80 the brake 53 is controlled via the precontrolled brake valve 83 (FIG. 4). The shifting operation between the neutral position 81, the forward drive position 79 and the reverse drive position 80 always is carried out when the disc clutch 4 is open.

The shifting cycle and the shifting comfort are produced by pressure ramps of the pressure generated by the transmission oil pump 12. Thereby volume dampers for the clutch 52 and the brake 53 become unnecessary. The brake 53 is actuated, via a closed system, by the precontrolled brake valve 83. The latter has a working piston 85 which is axially movably passed into a brake cylinder 84 and on its periphery is sealed in relation thereto by a seal 86. The working piston 85 forms in the brake cylinder 84 a working chamber 87 where a spring 88 is situated which presses the working piston 85 into an initial position. In this position, the working piston 85 abuts with a stop 94 on a front wall of the brake cylinder 84 and the brake 53 is opened.

In the proximity of the front wall is located a pressure connection 89 through which, in the reverse drive position 80 of the selector lever 78, pressure is fed via the shift valve 74, the pressure moving the working piston 85 against the force of the spring 88. At the same time, a control collar 92 traverses a pressure connection 90 for a precontrol pressure and closes the pressure connection 90 to the working chamber 87. The hydraulic medium, enclosed in the working chamber 87, is fed to the brake piston 54 of the brake 53 via an outlet 9. When the pressure drops on the pressure connection 89, the spring 88 moves the working piston 85 back to the initial position, the brake 53 becomes aerated. Thereby is obtained that the brake disc 55 in neutral position 81 and in forward drive operation 79 moves completely free and that no drag losses generate on the brake 53.

When the shift valve 74 is directly loaded with the pressure produced by the transmission oil pump 12, and the clutch 52 and the brake 53 are designed so as to be able, at this pressure and with adequate safety values, to transmit a torque corresponding to the secondary torque, even though it is possible to uncouple the variator in order to assist a parking adjustment. Therefore, it is convenient to front-mount a pressure-regulating valve 72 on the shift valve 74 which is controlled by an electronic pressure-control unit 67. Thereby the secondary variator pulley 20 can be uncoupled, via the reversing gear set 46, by the output 60 for parking adjustment. With the pressure-regulating valve 72, the clutch 52 and the brake 53 can be controlled separately from the pressure level of the transmission oil pump 12. The control by the electronic pressure-control unit 67 makes possible, via the first electronic control unit 65, a higher prioritization than the pressure distribution via the shift valve 74.

| Reference numerals | |
|---|---|
| 1 | prime mover |
| 2 | input shaft |
| 3 | clutch housing |
| 4 | disc clutch |
| 5 | disc |
| 6 | disc carrier |
| 7 | pressure plate |
| 8 | arms |
| 9 | axial bearing |
| 10 | annular piston |
| 11 | annular piston |
| 12 | transmission oil pump |
| 13 | drag |
| 14 | clutch bell housing |
| 15 | intermediate plate |
| 16 | transmission housing |
| 17 | bearing |
| 18 | primary shaft |
| 19 | variator pulley (primary) |
| 20 | variator pulley (secondary) |
| 21 | secondary shaft |
| 22 | fixed bearing |
| 23 | movable bearing |
| 24 | fixed bearing |
| 25 | movable bearing |
| 26 | bearing |
| 27 | shaft nut |
| 28 | shaft nut |
| 29 | cone |
| 30 | cone |
| 31 | cone |
| 32 | cone |
| 33 | longitudinal guide |
| 34 | ball |
| 35 | longitudinal guide |
| 36 | ball |
| 37 | belt-type organ |
| 38 | cylinder |
| 39 | piston |
| 40 | cylinder |
| 41 | piston |
| 42 | axial bearing |
| 43 | axial bearing |
| 44 | sealing ring |
| 45 | sealing ring |
| 46 | reversing gear set |
| 47 | sun gear |
| 48 | planetary gear |
| 49 | planetary gear |
| 50 | internal geared wheel |
| 51 | planet carrier |
| 52 | clutch |
| 53 | brake |
| 54 | brake piston |

-continued

| Reference numerals | |
|---|---|
| 55 | brake disc |
| 56 | brake caliper |
| 57 | output gear |
| 58 | intermediate step |
| 59 | differential |
| 60 | output shaft |
| 61 | rotational speed sensor |
| 62 | rotational speed sensor |
| 63 | rotational speed sensor |
| 64 | rotational speed sensor |
| 65 | first electronic control unit |
| 66 | electronic pressure-control unit |
| 67 | electronic pressure-control unit |
| 68 | electronic pressure-control unit |
| 69 | electronic pressure-control unit |
| 70 | electronic pressure-control unit |
| 71 | pressure-limiting valve |
| 72 | pressure-regulating valve |
| 73 | pressure-control valve |
| 74 | shift valve |
| 75 | pressure-regulating valve |
| 76 | pressure-control valve |
| 77 | pressure-control valve |
| 78 | selector lever |
| 79 | forward drive |
| 80 | reverse drive |
| 81 | neutral |
| 82 | oil sump |
| 83 | precontrolled brake valve |
| 84 | brake cylinder |
| 85 | working piston |
| 86 | seal |
| 87 | working chamber |
| 88 | spring |
| 89 | pressure connection |
| 90 | pressure connection precontrol |
| 91 | outlet |
| 92 | control collar |
| 93 | pressure supply pump |
| 94 | stop |
| 95 | second electronic control unit |
| 96 | ABS block |

What is claimed is:

1. An automatic transmission comprising:
   a) a dry disc clutch (4) for connecting a prime mover (1) to a primary shaft (18);
   b) a reversing gear set (46);
   c) a first electronic control unit (65);
   d) a first cone (29) fixedly supported on the primary shaft (18);
   e) a second hydraulically adjustable cone (30) axially adjustable relative to the first cone, the first and second cones (29, 30) together forming a primary variator pulley (19);
   f) a third cone (31) fixedly supported on a secondary shaft (21);
   g) a fourth hydraulically adjustable cone (32) axially adjustable relative to the third cone (31), the third and fourth cones (31, 32) together forming a secondary variator pulley (20);
   h) a belt-type element (37) drivingly connecting the primary variator pulley (19) with the secondary variator pulley (20);
   i) the dry disc clutch further comprising a dry disc clutch housing (3) fixedly connected with an input shaft (2) of the prime mover (1), a clutch disc non-rotatably connected with the primary shaft (18) of the primary variator, the clutch disc being disposed within the dry disc clutch housing in conjunction with a pressure plate (7) that is axially movable but non-rotatable with respect to the dry disc clutch housing and the dry disc clutch is closed by a redundant actuator system located within a clutch bell housing (14) axially moving the pressure plate (7) via an axial bearing (9) to engage the clutch disc with the dry disc clutch housing; and wherein the redundant actuator system comprises a first non-rotating actuator having a first annular piston (10) and a second non-rotating actuator having a second annular piston (11), the first and second redundant hydraulic actuators acting via the axial bearing (9).

2. The transmission according to claim 1, wherein the pressure plate (7) is connected via a drag (13) to a drive of a transmission oil pump (12).

3. The transmission according to claim 1, wherein in a normal operation the first electronic control unit (65) controls the first non-rotating actuator via a transmission oil pump (12) to close the dry disc clutch, while a second electronic control unit (95) controls the second non-rotating actuator via an independent pressure supply pump (93) to close the dry disc clutch upon at least one of i) failure of the first electronic control unit (65), ii) failure of the hydraulic system of the transmission, and iii) detection by the first and second electronic control units (65, 95) of an anti-lock braking system (ABS) operation.

4. The transmission according to claim 1, wherein the annular pistons (10, 11) are disposed in series around the primary shaft (18) and a drag (13) is a hollow shaft between the pressure plate (7) and a transmission oil pump (12), guided by the annular pistons (10, 11) and supported upon the primary shaft (18) via a bearing (17).

5. The transmission according claim 1, wherein the primary shaft (18) and the secondary shaft (21) are, respectively, supported by, movable bearings (23, 25), that allow for longitudinal compensation and are respectively located on the first and third fixed cones (29,31) of the variator pulleys (19, 20), and axial bearings (42,43) for the second and fourth axially movable cones are connected to a transmission housing (16) via a first and second cylinder-piston unit (38,39;40,41);

the primary shaft (18) also being supported by a first fixed bearing (22) that is coupled to an intermediate plate (15) and the intermediate plate (15) is firmly connected to the transmission housing (16); and the secondary shaft (21) is further supported by a second fixed bearing (24).

6. The transmission according to claim 5, wherein the reversing gear set (46) is located upon the secondary shaft (21) in the form of a planetary gear with a double planetary gears (48, 49), a sun gear (47) and an internal geared wheel (50), wherein the sun gear (47) is non-rotatably connected with the secondary shaft (21) and via a clutch (52) can be coupled with a planet carrier (51) which is non-rotatably connected with an output gear (57), and a brake (53) being attached to the internal geared wheel (50).

7. The transmission according to claim 6, wherein the planet carrier (51) is connected with a clutch disc of the clutch (52) and a disc carrier of the clutch (52) is connected with the secondary shaft (21).

8. The transmission according to claim 6, wherein the brake (53) is a disc brake in which a disc (55) of the brake (53) is fixedly mounted on the internal geared wheel (50) and is situated in a brake caliper (56) between two brake pistons (54) which are controlled via a brake valve (83).

9. The transmission according to claim 6, wherein the first and second cylinder-piston unit (38, 39, 40, 41) have cylinders to provide a contact force requirement on at least the fourth axially movable cone, and taking into account the smallest possible system pressure, for maintaining a precontrolled pressure supply of electronic pressure-control units (66, 67, 68, 69, 70) and a theoretical minimum pressure for a constant forward drive based on a whole load range and a rotational speed range.

10. The transmission according to claim 9, wherein the transmitting capacity of the clutch (52) and brake (53) of the reversing gear set (46) are selected so that the pressure operating the secondary variator pulley (20) includes a desired safety factor to be used directly as an operating pressure for the clutch (52) and brake (53).

11. The transmission according to claim 9, wherein the reversing gear set (46) is shifted only when the dry disc clutch (4) is open, and a shift cycle is controlled by pressure ramps of the actuating pressure of the second cylinder-piston unit (40,41) of the secondary variator pulley (20).

12. The transmission according to claim 6, wherein the brake (53) of the reversing gear set (46) is actuated via a closed system by a precontrolled brake valve (83), and a working piston (85) is directly connected with the actuating pressure of the second cylinder-piston unit (40,41) of the secondary variator pulley (20) via a shift valve (74) that is controlled by a reverse drive (80) of a selector lever (78), and a working volume between a brake piston (54) to a brake disc (55) against the force of a spring (88).

13. The transmission according to claim 12, wherein a pressure-regulating valve (72) is located ahead of a shift valve (74) for pressure control in the clutch (52).

14. The transmission according to 12, claim wherein for controlling an operating cycle, and regulating a variator ratio and the disc clutch (4), Hall sensors (61, 62, 63, 64) are placed on the dry disc clutch housing (3), detecting rotational speed, of the prime mover the primary shaft (18) for measuring rotational speed of the primary variator pulley (19), the secondary shaft (21) for measuring rotational speed of the secondary variator pulley (20), and on a differential (59) for measuring speed of the output shaft (60).

15. The transmission according to claim 1, wherein the first non-rotating actuator of the dry disc clutch (4) is controlled through the transmission hydraulic system via a pressure-control valve (73) by an electronic pressure-control unit (68) so an appertaining cylinder of the first hydraulic actuator is ventilated and thus/opens the dry disc clutch (4) when the first electronic control unit (65) of the transmission changes over to an emergency operation.

16. The transmission according claim 1, wherein the second non-rotating actuator is controlled by an electronic pressure-control unit (70), situated in the transmission, when the independent, pressure supply pump (93) is activated is directly controlled by a pressure-control valve (76) integrated in an ABS block (96) in case of power failure so that a cylinder of the second non-rotating actuator is ventilated and the disc clutch (4) is opened.

17. The transmission according to claim 16, wherein the control of the second hydraulic actuator is integrated in an electronic engine control which via a CAN bus communicates with the second control electronic unit (95) and the first electronic control unit (65).

18. The transmission according to claim 1, wherein the second and fourth axially movable cones (30, 32) are controlled according to a master-slave principle.

19. The transmission according to claim 1, wherein the second and fourth axially movable cones (30, 32) are controlled according to a partner principle.

20. The transmission according to claim 19, wherein to control the primary variator pulley (19) and the secondary variator pulley (20), respectively separate electronic pressure-control units are provided with one of a pressure-control unit (66, 69) and a pressure-regulating valve (75).

* * * * *